May 6, 1941.

C. C. COONS 2,241,117

REFRIGERATION

Filed Aug. 17, 1939

INVENTOR
Curtis C. Coons

BY Harry S. Dumarsh

ATTORNEY

INVENTOR
Curtis C. Coons
BY Harry S. DuMars
ATTORNEY

Patented May 6, 1941

2,241,117

UNITED STATES PATENT OFFICE 2,241,117

REFRIGERATION

Curtis C. Coons, North Canton, Ohio, assignor to The Hoover Company, North Canton, Ohio, a corporation of Ohio Application August 17, 1939, Serial No. 290,556

16 Claims. (Cl. 62—5)

This invention relates to the art of refrigeration and more particularly to a novel three-fluid absorption refrigerating system so constructed and arranged that the system automatically compensates itself for variations induced by atmospheric temperature changes.

In the operation of three-fluid absorption refrigerating systems of the type utilizing a refrigerant and an absorbent therefor and an inert gas, it has been found that the efficiency of the apparatus tends to decrease with increasing room temperature. This results from the fact that the high room temperatures, and consequently the high temperature of the cooling air, prevents the absorber from operating at as low a temperature as would be ideally desirable. Therefore, the absorbing process decreases in efficiency and the lean gas which is returned from the absorber to the evaporator contains too high a concentration of refrigerant vapor for most efficient operation of the system.

Accordingly, it is a principal object of the present invention to provide an absorption refrigerating apparatus of the above described type in which the capacity and operating characteristics of the apparatus are maintained as the room temperature increases by increasing the rate at which the absorption solution circulates through the absorber and boiler-analyzer assembly. The result of this is that the concentration of the strong solution returning from the absorber to the boiler is decreased, but as a greater quantity of solution is circulating per unit of time, the concentration of the refrigerant vapor in the inert gas in the various portions of the absorber is maintained at a reasonably efficient value.

It is a still further object of the present invention to provide a three-fluid absorption refrigerating apparatus in which the rate of circulation of the absorption solution is regulated by progressively varying the pressures to which certain portions of the absorption solution circuit are subjected.

It is still another object of the present invention to provide a three-fluid absorption refrigerating apparatus of the type in which the absorption solution is circulated by means of a gas lift pump in which the rate of solution circulation is governed by regulating the depth of immersion of the pump.

It is still another object of the present invention to provide an absorption refrigerating apparatus in which the rate of solution circulation is regulated by selectively subjecting certain portions thereof to a pressure differential existing between selected portions of the refrigerating apparatus.

It is another object of the present invention to provide an absorption refrigerating apparatus including a solution circuit having a gas lift circulating pump therein in which the rate of solution circulation is governed by regulating the pressure applied to the liquid on the liquid inlet side thereof.

Other objects and advantages of the invention will be come apparent as the description proceeds when taken in connection with the accompanying drawings, in which.

Figure 1:
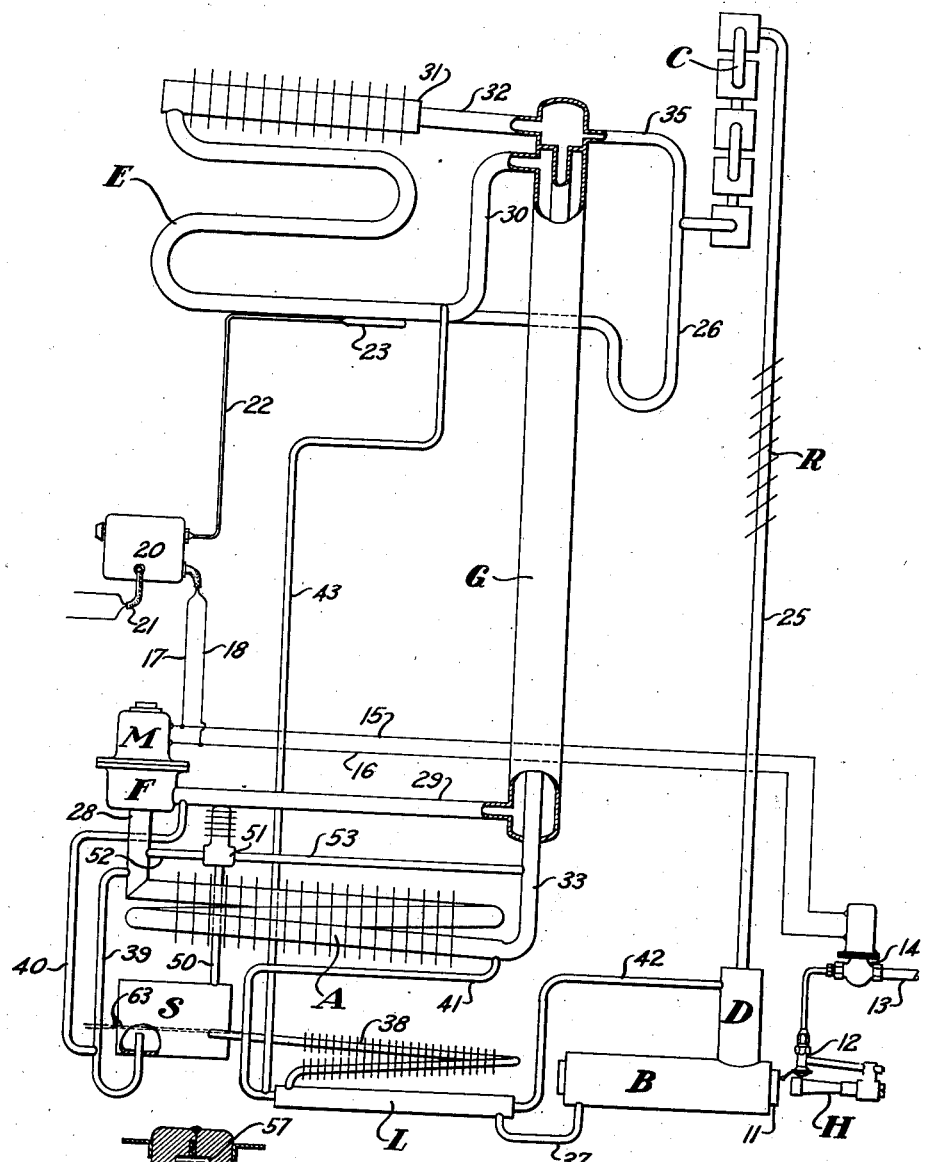
Figure 1 is a diagrammatic representation of one form of the invention.
Figure 2:
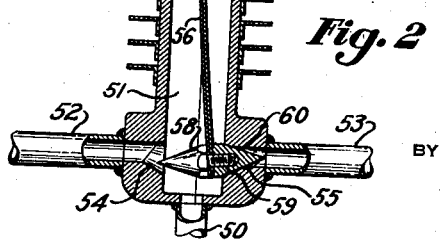
Figure 2 is a partial sectional elevational view of a detail drawn to an enlarged scale.

Referring now to the drawings in detail and first to Figures 1 and 2 thereof, there is disclosed a three-fluid absorption refrigerating apparatus comprising a boiler B, an analyzer D, an air-cooled rectifier R, a tubular air-cooled condenser C, an evaporator E, a gas heat exchanger G, a liquid heat exchanger L, a solution reservoir S, a tubular inclined air cooled absorber A, a heater H for the boiler B, and a circulating fan F which is driven by an electrical motor M. The above mentioned elements are suitably interconnected by various conduits to form a plurality of gas and liquid circuits constituting a complete refrigerating system to which reference will be made in more detail hereinafter.

The above described refrigerating system will be charged with a suitable absorbent, such as water, a suitable refrigerant, such as ammonia, and an inert pressure equalizing medium preferably a dense inert gas, like nitrogen.

Any suitable form of heater may be utilized for the boiler B. However, as illustrated, the heater comprises a gas burner H positioned to discharge products of combustion through a central tube 11 provided in the boiler. The gas burner H includes a suitable flame failure safety cut-off mechanism indicated generally at 12. Fuel is supplied to the burner H through a gas supply conduit 13 which includes a solenoid actuated control valve 14.

The solenoid valve 14 and the electrical motor M are connected by suitable electrical conductors 15 and 16 which are energized from a control mechanism 20 by electrical conductors 17 and

18, respectively. The control mechanism 20 is supplied with electrical energy from the line 21 and includes a thermostatically actuated switch which governs the energization of the lines 17 and 18 and consequently the energization of the solenoid valve and the motor M. The control mechanism may be responsive to temperature conditions at the evaporator as is illustrated by means of the capillary conduit 22 and bulb element 23 or the bulb element 23 may be positioned within a space to be refrigerated and in contact with the air therein contained.

The application of heat to the boiler B generates refrigerant vapor from the strong solution therein contained. The vapor so produced passes upwardly through the analyzer D in counterflow to strong solution flowing downwardly therethrough. The refrigerant vapor is then conveyed from the upper portion of the analyzer to the upper portion of the condenser C by means of a conduit 25 which includes the air-cooled rectifier R.

The refrigerant vapor supplied to the condenser C is liquefied therein by heat exchange with cooling air and is conveyed from the bottom portion of the condenser to the bottom portion of the evaporator E by means of the conduit 26 which includes a downwardly extending U-shaped portion for a purpose to be described hereinafter.

The circulating fan F receives lean inert gas from the absorber A by means of the conduit 28 and places such gas under pressure. The gas thus placed under pressure is conveyed from the circulating fan F to the bottom portion of the evaporator E by means of the conduit 29, the gas heat exchanger G, and a conduit 30.

The evaporator may be of any desired or preferred construction. However, as is illustrated herein there is diagrammatically shown an evaporator of the type in which the inert gas circulates with a velocity sufficient to propel the liquid refrigerant upwardly through the evaporator as it is evaporating thereinto. A preferred form of this type of evaporator is disclosed and claimed in the co-pending application of Curtis C. Coons and William H. Kitto, Serial No. 220,189, filed July 20, 1938.

The rich gas produced in the evaporator is conveyed from the finned box-cooling section 31 thereof to the bottom portion of the absorber by means of the conduit 32, the gas heat exchanger G, and a conduit 33.

The rich inert gas then flows upwardly through the absorber in counterflow relationship with lean solution flowing downwardly therethrough. Refrigerant vapor is absorbed in the absorption solution and the resulting heat of absorption is rejected to cooling air flowing over the exterior walls of the absorber vessel and the cooling fins mounted thereon. The resulting lean gas is then conveyed back to the circulating fan F by way of the conduit 28, thus completing the inert gas circuit.

The pressure prevailing on the inlet side of the evaporator E and the conduit 30 is higher than that prevailing in the conduit 32 by an amount equal to the resistance of the evaporator wherefore a pressure balancing liquid column is supported in the conduit 26 and is vented by means of the conduit 35 to the rich gas side of the gas heat exchanger. The absorption solution in the boiler-analyzer assembly is subjected to the discharge pressure of the evaporator E by reason of the connection between the rich gas side of the gas heat exchanger G and the conduit 35.

The lean solution formed in the boiler B by the generation of refrigerant vapor therefrom is conveyed from the boiler to a solution reservoir S by way of the conduit 37, the liquid heat exchanger L, and a looped, finned solution pre-cooling conduit 38.

The lean solution is then conveyed from the reservoir S into the upper portion of the absorber; that is, the lean gas discharge conduit 28, by means of a gas lift pumping conduit 39. Pumping gas is supplied to the conduit 39 below the liquid level normally therein contained by means of a conduit 40 which connects to the discharge conduit 29 of the circulating fan F. The gas lift pump 40 operates across the greatest pressure differential existing in any part of the system, namely that existing between the suction and discharge conduits of the circulating fan F. By this means the lean solution is elevated into the absorber by gas lift action. The solution flows through the absorber by gravity in counterflow relationship with the rich mixture flowing upwardly therethrough as described previously.

If desired, the absorber may include suitable obstructing and guiding devices to improve the gas and liquid contact and the heat rejection. An example of such a device is disclosed and claimed in the co-pending application of William H. Kitto, Serial No. 206,143, filed May 5, 1938.

The rich solution formed in the absorber is conveyed therefrom to the upper portion of the analyzer D by way of the conduit 41, the liquid heat exchanger L and the conduit 42.

A suitable anti-blocking and overflow drain 43 is connected between the upper portion of the lowest evaporator conduit and the rich solution return conduit 41.

It is desirable to vent the solution reservoir S to a part of the system subjected to a pressure appreciably below that prevailing in the discharge conduit 29 of the circulating fan F in order to raise the liquid level therein and thus to decrease the height through which the gas lift pump must operate. Such a vent is also desirable to relieve the solution reservoir of any gases which may find their way thereinto or be evolved from the liquid content thereof.

It is also desirable in systems of this type to provide a means for governing the rate at which the absorption solution circulates through the solution circuit to compensate the apparatus for changes induced by variations in atmospheric temperature conditions. For this purpose the upper portion of the reservoir S is vented by means of a conduit 50 to the bottom central portion of a control valve housing 51. The opposite lower portions of the casing 51 are vented to the conduits 28 and 33 by means of conduits 52 and 53, respectively. The casing 51 is provided with oppositely facing valve seats 54 and 55, controlling the communication between the interior of the casing 51 and the conduits 52 and 53, respectively.

A bimetallic thermostatic element 56 is secured, as indicated at 57, in the upper portion of the casing 51 and extends downwardly therein to a position between the facing valve ports 54 and 55.

The lower end of the bimetallic element 56 carries a valve plug element 58 adapted to be seated in the valve port 54. The valve plug element 58 carries a projecting bolt 59 which projects through the lower end of the bimetallic thermostat 56 and threadedly receives a valve plug element 60 which is adapted to seat in the valve port 55. By this means the valve plugs 58 and 60 are rigidly secured to each other and to the thermostatic strip 56.

The upper portion of the chamber 51 which houses the bimetallic element 56 is provided with a plurality of radiating fins indicated generally at 61.

The pressure prevailing in the conduit 28 will be lower than that prevailing in the conduit 33 by an amount equal to the pressure drop in the inert gas as it flows through the absorber A. In ordinary domestic type refrigerating systems such pressure drop will be in the order of a few tenths of an inch of water.

It is apparent from Figure 2 that with the valve in the position indicated the conduit 50 has free communication with the conduit 52 but no communication with the conduit 53 and that if the valve shifted to its opposite position, the conduits 50 and 53 will be in free communication, and no communication will be permitted between the conduits 50 and 52. By this means the pressure to which the liquid in the reservoir S is subjected may be varied over a range of a few inches of water.

This variation in pressure will produce a change in the liquid level within the reservoir S of an approximate maximum amount indicated by the dotted lines 63 which have been shown on the reservoir. The level will be at the upper dotted line, for example, when the valve is in the position shown in Figure 2, and the level will be at the lower dotted line when the bimetallic thermostat has operated the valve plug 58 into engagement with the seat 54 and has thus opened the port 55 to provide communication between the conduits 50 and 53. Therefore, the liquid level prevailing in the reservoir S and hence the depth of immersion of the gas lift pump may be regulated between the levels indicated by the dotted lines 63 depending upon the position of the valve plugs 58 and 60.

For the purposes of this application the depth of immersion of the gas lift pump may be defined as the distance between the free surface of the liquid in the pumping conduit under static conditions and the point at which the pumping gas is supplied to the pumping conduit. In general, other things being equal, an increase in the depth of immersion of the apparatus will increase the quantity of liquid pumped per unit of time.

With the herein disclosed apparatus the depth of immersion may be varied anywhere between the dotted lines indicated by 63 as the valve plugs 58 and 60 are designed to exert a throttling effect on their associated valve ports 54 and 55 except in the full open or full closed position. Therefore, the effective pressure differential, that is, the pressure above that prevailing in the conduit 28 to which the contents of the reservoir S are subjected may be varied infinitely between the pressure prevailing in the conduit 28 and that prevailing in the conduit 33 and the liquid level in the reservoir S will vary accordingly with consequent variation in the depth of immersion of the gas lift pump and of the quantity of solution circulated thereby per unit of time.

The operation of the apparatus is as follows: With the room temperature at the lowest value normally to be encountered in actual operation of the system the thermostat 56 will be flexed to the right in the position shown in Figure 2 wherefore the reservoir S will be subjected to the suction pressure of the circulating fan by way of the conduit 52, the chamber 51 and the conduit 50. As a result of this the liquid in the lifting conduit 39 and in the solution reservoir S will be subjected to the suction pressure of the fan and the liquid level in the pumping conduit 39 will be at its minimum value.

As the room temperature gradually increases the temperature of the thermostat 56 will be increased by absorption of heat through the heat radiating fins 61 and will gradually cause the thermostat 56 to flex to the left as viewed in Figure 2. Eventually the valve plug 58 will seat upon the valve port 54, thereby preventing communication between the conduits 52 and 50 and allowing free unthrottled communication between the conduits 53 and 50. Under these conditions the reservoir S is subjected to the pressure prevailing in the conduit 33 whereas the gas lift pump conduit 39 is subjected to the suction pressure of the fan. Therefore, the liquid level in the lifting conduit 39 will rise by an amount equal to the pressure differential between the conduits 38 and 33. This will increase the rate at which the solution is circulated and will compensate the apparatus for the decreased efficiency of the absorber.

It will be understood that intermediate temperature conditions are compensated proportionately by reason of the throttling action of the valve plugs 58 and 60 except when the same are fully opened or fully closed. Therefore, assuming a maximum pressure differential between the conduits 28 and 33 of $\frac{3}{10}''$ of water, the liquid level in the pumping conduit 39, and hence the depth of immersion of the gas lift pump, will vary a full $\frac{3}{10}''$, which is amply sufficient to give the required differential in the rate of flow of the absorption solution for the purpose of compensating the operation of the apparatus for changes induced by variations in room temperature conditions.

Thus, if the room temperature rises and the ability of the absorption solution to remove refrigerant vapor from the inert gas decreases, the total absorption capacity of the apparatus is maintained at a constant value by supplying a greater quantity of solution per unit of time to the absorber with the net result that the concentration of the strong solution is slightly decreased in the conduit 41 but the quantity of refrigerant vapor absorbed per unit of time from the inert gas remains substantially constant by reason of the greater quantity of absorption solution supplied to the absorber for this purpose.

Figure 3:
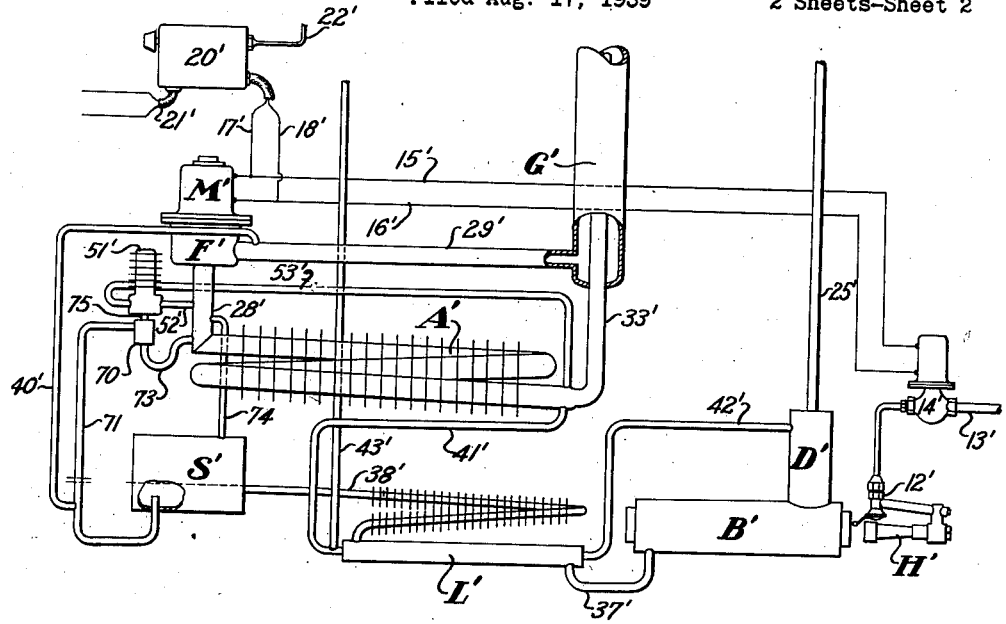
Figure 3 is a diagrammatic representation of a modified form of the invention.

Referring now to Figure 3 there is disclosed a modified form of the invention. Certain portions of this form of the invention are identical with the invention disclosed in Figures 1 and 2 and are therefore given the same reference characters primed. This form of the invention differs from that described in connection with Figures 1 and 2 only with respect to certain details of the absorption solution circuit and therefore only that portion of the apparatus has been illustrated.

In this form of the invention the absorption solution is conveyed from the solution reservoir S' to a gas and liquid separation chamber 70 by means of a gas lift pump conduit 71 which receives pumping gas from the conduit 40' which is connected to the fan discharge conduit 29'. The lean absorption solution then flows through a U-tube 73 from the bottom portion of the separation chamber 70 into the lean gas discharge conduit 28' of the absorber.

The solution reservoir is preferably vented to the conduit 28' by means of a vent conduit 74.

The upper portion of the separation chamber 70 is connected by means of a conduit 75 to the bottom central portion of a thermostatic valve chamber 51' which is identical in construction with the thermostatic valve chamber 51 and its associated parts described heretofore in connection with Figures 1 and 2. It will be observed that the connection 52' and 53' between the valve chamber 51' and the conduits 28' and 33', respectively, are now reversed from those illustrated in Figures 1 and 2. Therefore, in this form of the invention the high pressure connection 53' is open to the conduit 75 under low temperature condition with the result that the liquid level in the pumping conduit 71 will be depressed below that in the reservoir S' which is vented directly to the suction conduit 28'. On the other hand, under high temperature conditions connection is provided between the conduits 52' and 75 which thus subjects the elevating conduit 71 directly to the suction pressure of the fan wherefore the liquid level in the conduit 71 raises up to that prevailing in the reservoir S' and the maximum solution rate of flow is provided. With the above exception this form of the invention operates in exactly the same way as that described above in connection with Figures 1 and 2.

Figure 4:
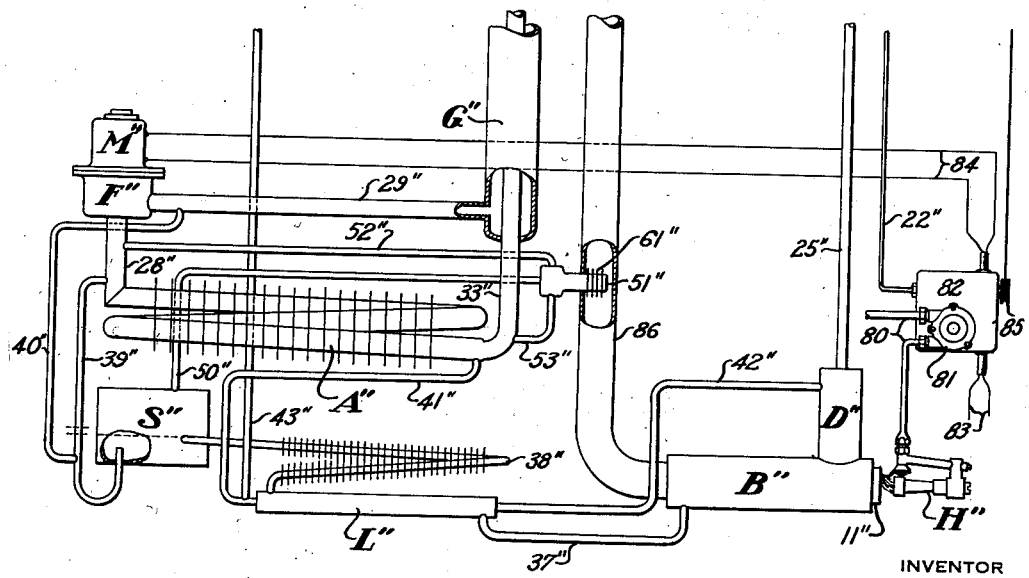
Figure 4 is a diagrammatic representation of a further modification of the invention.

Referring now to Figure 4 there is disclosed another modification of the invention certain portions of which are identical with parts heretofore illustrated and described in connection with Figures 1 and 2 and are given the same reference characters double primed.

In this form of the invention gas is supplied to the burner H" by means of a conduit 80 which includes a modulating gas supply valve 81 of known type. The valve 81 is controlled by means of a simple thermostatic control mechanism 82 which may be of any desired or preferred construction which will maintain the energization of the circulating motor except during periods of substantially complete failure of demand for refrigeration and which will modulate the supply of fuel to the burner H" in accordance with refrigeration demand. A preferred construction of such a control mechanism is disclosed and claimed in the copending application of Arnold D. Siedle and William H. Kitto, Serial No. 160,274, filed August 21, 1937.

Electrical energy is supplied to the control mechanism 82 from the line 83 and the control mechanism 82 is connected to the motor M" by the electrical conductors 84. As shown, the control mechanism 82 is adjusted from a remote adjusting dial, for example, a dial mounted upon the upper portion of the evaporator by means of a cable and pulley arrangement 85.

The products of combustion which are supplied to the central boiler tube 11" are removed therefrom by an exhaust flue 86 which receives the finned portion of the valve chamber 51", whereby the fins 61" are directly subjected to the waste products of combustion discharged from the burner H".

The form of connection between the conduits 50", 52", 53" and valve mechanism 51" is identical with that disclosed in connection with Figure 1, though the arrangement disclosed in Figure 2 may also be utilized without departing from the concepts of this form of the invention so long as the valve chamber 51" is within the flue pipe 86.

In this form of the invention the rate at which fuel is supplied to the burner H" and hence the rate at which heat is supplied to the boiler B", is varied infinitely in accordance with the demand for refrigeration by the modulating valve 81. Under such conditions it is highly desirable to vary the rate at which the solution circulates with the rate at which heat is supplied to the boiler B" in order to maintain proper concentration in various portions of the apparatus.

In the forms of the invention described above in connection with Figures 1 to 3, the rate at which heat is supplied to the boiler B or B' is constant during the operating periods thereof and the only compensation which the apparatus needs is that which is required because of changes in the temperature condition of the cooling air which varies the efficiency and absorbing capacity of the absorber. With the form of the invention illustrated in Figure 4, however, the apparatus will automatically compensate for variations in room temperature as the same will increase the load on the refrigerator and will cause a greater quantity of heat to be supplied to the boiler B" which in turn will cause an increase in the temperature of the flue gases passing through the conduit 86, thereby causing the valve mechanism within the chamber 51" to connect the pipe 50" and 53" which will increase the depth of immersion in the gas lift pump 39" and to increase the rate at which the solution is pumped.

In this form of the invention the rate at which the solution circulates varies infinitely and directly with the rate at which heat is supplied to the boiler B" and is controlled by the temperature of the discharge products from the boiler B" which acts directly upon the thermostatic control valve mechanism 51".

The present invention provides a mechanism whereby the rate of flow of the solution is automatically governed by selectively and variably altering the pressure to which various portions of the solution circuit are subjected to vary the effective head against which the circulating pump operates by altering the depth of immersion or the discharge pressure, as the case may be, of the gas lift pump. The operating characteristics of the system are thus maintained within desired limits.

It will be appreciated that the various vent conduits, such as those exemplified by the conduits 52 and 53 may be connected across other portions of the apparatus than those illustrated. The points of connection of these conduits will be determined primarily by the maximum pressure differential or the maximum variation in the depth of immersion of the gas lift pump which it is desired to obtain, though in general only a small variation will be necessary or desirable.

While the invention has been illustrated and described herein in considerable detail, various changes may be made in the construction, proportion and arrangement of parts without departing from the spirit of the invention or the scope of the appended claims.

I claim:

1. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a gas lift pump in said solution circuit for circulating the absorption solution therethrough, and means for selectively subjecting selected portions of said solution circuit to the pressure prevailing in selected areas of the apparatus in accordance with an operating condition of the apparatus.

2. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a circulating pump in said solution circuit, and means responsive to a condition affecting the operation of the apparatus for altering the effective head against which said pump operates by subjecting a portion of said solution circuit to a differential proportion of the pressure differential existing between selected portions of said apparatus.

3. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a circulating pump in said solution circuit, and means responsive to a condition affecting the operation of the apparatus for altering the effective head against which said pump operates by subjecting a portion of said solution circuit to the pressure prevailing in selected portions of said inert gas circuit.

4. Absorption refrigerating apparatus comprising an inert gas circuit including an evaporator and an absorber, a solution circuit including a boiler and said absorber, means for liquefying refrigerant vapor produced in said boiler and for supplying the same to said evaporator, means for heating said boiler, means for conveying waste products of combustion away from said boiler, a gas lift circulating pump in said solution circuit, temperature responsive means arranged to respond to a thermal condition affecting the operation of the apparatus for varying the effective head against which said pump operates in accordance with said thermal condition.

5. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a circulating pump in said solution circuit, means venting a portion of said solution circuit in such relation to said pump that the pressure prevailing therein will alter the rate at which solution is pumped to portions of said inert gas circuit between which a pressure differential normally exists, and means for governing the communication between said portion of said solution circuit and said portions of said inert gas circuit through said venting means.

6. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a circulating pump in said solution circuit, means venting a portion of said solution circuit in such relation to said pump that the pressure prevailing therein will alter the rate at which solution is pumped to portions of said inert gas circuit between which a pressure differential normally exists, and thermostatically actuated throttling means in said venting means for regulating the resistance thereof.

7. Absorption refrigerating apparatus comprising an inert gas circuit including an evaporator and an air-cooled absorber, a solution circuit including a boiler and said absorber, means for liquefying refrigerant vapor produced in said boiler and for supplying the same to said evaporator, a circulating pump in said solution circuit, means venting a portion of said solution circuit in such relation to said pump that the pressure prevailing therein will alter the rate at which solution is pumped to portions of said inert gas circuit between which a pressure differential normally exists, and means responsive to the temperature of the cooling air for varying the effectiveness of the communication between said portion of said solution circuit and said portions of said inert gas circuit.

8. Absorption refrigerating apparatus comprising an inert gas circuit including an evaporator and an absorber, a solution circuit including a boiler and said absorber, means for liquefying refrigerant vapor produced in said boiler and for supplying the same to said evaporator, means for heating said boiler, means for conveying waste products of combustion away from said boiler, a gas lift circulating pump in said solution circuit, and means responsive to the temperature of the waste products of combustion of said heater for varying the effective head against which said circulating pump operates.

9. Absorption refrigerating apparatus comprising an inert gas circuit including an evaporator and an air-cooled absorber, a solution circuit including a boiler and said absorber, means for liquefying refrigerant vapor produced in said boiler and for supplying the same to said evaporator, a circulating pump in said solution circuit, a reservoir in said solution circuit connected to the supply side of said pump, means venting said reservoir to a low pressure area of said inert gas circuit, a vessel into which said circulator discharges, means for conveying solution from said vessel into another portion of said solution circuit, and means responsive to the temperature of the cooling air for subjecting said vessel to a pressure which is a variable proportion of a fixed pressure differential existing between selected parts of said inert gas circuit.

10. Absorption refrigerating apparatus comprising an inert gas circuit including an evaporator and an air-cooled absorber, a solution circuit including a boiler and said absorber, means for liquefying refrigerant vapor produced in said boiler and for supplying the same to said evaporator, a circulating pump in said solution circuit, a reservoir in said solution circuit connected to the supply side of said pump, means venting said reservoir to said inert gas circuit on each side of said absorber, and means responsive to the temperature of the cooling air for subjecting said reservoir to a pressure which varies in accordance with the temperature of the cooling air between the pressures prevailing in said inert gas circuit on opposite sides of said absorber.

11. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a power driven circulator in said inert gas circuit, a gas lift pump in said solution circuit, means for supplying pumping gas under pressure from said inert gas circuit to said gas lift pump, means for varying the effective head against which said pump operates including means providing communication between a portion of said solution circuit and portions of said inert gas circuit between which a pressure differential normally exists, and a valve in said last mentioned means arranged to vary the degree of communication between said reservoir and said portions of said inert gas circuit.

12. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a heater for said boiler, refrigeration demand responsive means for governing the rate at which heat is supplied to said boiler from said heater, a gas lift pump for circulating the absorption solution through said solution circuit, and means responsive to the rate at which heat is supplied to said boiler for varying the pressure in a portion of said solution circuit so related to said gas lift pump that such pressure variations produce corresponding changes in the rate of solution circulation.

13. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a circulating pump in said solution circuit, means connecting a portion of said solution circuit to two other portions of said apparatus between which a static pressure differential exists, thermostatic control means in said connecting means including a valve casing connected to said portions of different static pressure and to said portion of said solution circuit, valve means constructed and arranged to control the communication between said casing and said means connected to said portions of said apparatus at different static pressures, and a thermostat in said casing operatively connected to said valve means.

14. That improvement in refrigerating systems of the type utilizing a refrigerant, an absorbent therefor and an inert pressure equalizing medium which includes the steps of circulating the absorbent between an absorbing zone in which refrigerant vapor is added thereto and a generating zone in which refrigerant vapor is expelled therefrom by introducing a propelled stream of the pressure equalizing medium thereinto, rejecting the heat of absorption by passing a cooling medium in heat transfer relationship with the absorbent to which refrigerant vapor is being added, propelling the pressure equalizing medium between a cooling zone in which refrigerant vapor is added thereto and the absorbing zone in which refrigerant vapor is removed therefrom, and altering the effective head against which the absorbent is circulated to regulate the operation of the system by subjecting a selected area of the circulating absorbent to a proportion variable with the temperature of the cooling medium of the pressure differential prevailing between selected areas of the system.

15. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a gas lift pump in said solution circuit for circulating the absorption solution therethrough means for conducting pumping gas from said inert gas circuit to said gas lift pump for operating the same, and means for selectively subjecting selected portions of said solution circuit to the pressure prevailing in selected areas of the apparatus in accordance with an operating condition of the apparatus.

16. Absorption refrigerating apparatus comprising an inert gas circuit including an evaporator and an absorber, a solution circuit including a boiler and said absorber, means for liquefying refrigerant vapor produced in said boiler and for supplying the same to said evaporator, a heater for said boiler, refrigeration demand responsive means for governing the rate at which heat is supplied to said boiler from said heater, a gas lift pump for circulating the absorption solution through said solution circuit, means for conducting pumping gas from said inert gas circuit to said gas lift pump for operating the same, and means responsive to the rate at which heat is supplied to said boiler for varying the pressure in a portion of said solution circuit so related to said gas lift pump that such pressure variations produce corresponding changes in the rate of solution circulation.

CURTIS C. COONS.